United States Patent
Wakabayashi et al.

(10) Patent No.: US 8,755,134 B2
(45) Date of Patent: Jun. 17, 2014

(54) ND FILTER, AND IRIS DEVICE AND OPTICAL APPARATUS HAVING THE SAME

(75) Inventors: Takayuki Wakabayashi, Chichibu (JP); Masayuki Uchiyama, Honjo (JP); Yasunori Saito, Honjo (JP); Michio Yanagi, Chichibu (JP)

(73) Assignee: Canon Denshi Kabushiki Kaisha (JP)

( * ) Notice: Subject to any disclaimer, the term of this patent is extended or adjusted under 35 U.S.C. 154(b) by 942 days.

(21) Appl. No.: 11/467,329

(22) Filed: Aug. 25, 2006

(65) Prior Publication Data

US 2007/0047118 A1 Mar. 1, 2007

(30) Foreign Application Priority Data

Aug. 30, 2005 (JP) .................................. 2005-248717
Aug. 9, 2006 (JP) .................................. 2006-216462

(51) Int. Cl.
*G02B 5/22* (2006.01)

(52) U.S. Cl.
USPC .......................................... 359/885; 359/888

(58) Field of Classification Search
USPC ....................................................... 359/888
See application file for complete search history.

(56) References Cited

U.S. PATENT DOCUMENTS

| 6,078,442 A * | 6/2000 | Tada et al. ...................... 359/890 |
| 6,866,431 B2 * | 3/2005 | Namazue et al. .............. 396/450 |
| 7,042,662 B2 * | 5/2006 | Murata et al. .................. 359/888 |

FOREIGN PATENT DOCUMENTS

| JP | 2002-277612 | 9/2002 | |
| JP | 2004-253892 | 9/2004 | |
| JP | 2004253892 A * | 9/2004 | ............. H04N 5/238 |
| JP | 3621941 | 11/2004 | |
| JP | 2005-017986 | 1/2005 | |
| JP | 2005-301155 A | 10/2005 | |
| JP | 2006-227432 A | 8/2006 | |

OTHER PUBLICATIONS

Office Action dated Sep. 7, 2007 concerning the corresponding Chinese patent application No. 2006101266027 and English translation.

* cited by examiner

*Primary Examiner* — Jade R Chwasz
(74) *Attorney, Agent, or Firm* — Rossi, Kimms & McDowell LLP

(57) ABSTRACT

An ND filter that enables relatively easy control of light quantity when used in an iris device and realizes excellent optical performance. The ND filter has a first region having an ND film with a uniform density, a second region having an ND film with a uniform density different from the density of the first region, and a density transition region provided between the first region and the second region. The density transition region has an ND film whose density changes continuously from the density of the first region to the density of the second region.

7 Claims, 7 Drawing Sheets ously on the object illuminance, or in some apparatuses, information on the set focal length of a zoom lens and information on the focusing position (length) of the lens are also used as control parameters.

ND FILTER, AND IRIS DEVICE AND OPTICAL APPARATUS HAVING THE SAME

This application claims a benefit of priority under 35 U.S.C. §119 based on Japanese Patent Application Nos. 2005-248717, filed Aug. 30, 2005, and 2006-216462, filed on Aug. 9, 2006, which are hereby incorporated by reference in their entirety as if fully set forth herein.

BACKGROUND OF THE INVENTION

1. Field of the Invention

The present invention relates to an ND filter, an iris device and an optical apparatus having the ND filter.

2. Description of the Related Art

Conventionally, in image pick-up apparatuses such as video cameras, an ND (neutral density) filter has been used in the light quantity reduction device thereof to prevent the aperture from becoming extremely small for the bright object field, thereby avoiding undesirable phenomena such as hunting and diffraction of light.

Specifically, there are known iris devices using an ND filter. For example, there are an iris reduction device using a step ND filter having multi-density ND film that vary stepwise as disclosed in Japanese Patent Application Laid-Open No. 2002-277612 and an iris device using a gradation ND filter whose density varies in a stepless manner over a large density variation range as disclosed in Japanese Patent No. 03621941.

In the case where a conventional ND filter is used in an iris device, a rather complex control is required.

Specifically, the difference between the photometry value on the light quantity transmitted through the iris device at a certain time and an appropriate transmitted light quantity is computed, and an aperture blade or an ND filter is operated in accordance with a predetermined algorithm based on the difference, whereby an appropriate exposure amount can be attained. In addition, to attain optimum exposure or to perform optimum exposure correction, the control algorithm may be changed depending on the object illuminance, or in some apparatuses, information on the set focal length of a zoom lens and information on the focusing position (length) of the lens are also used as control parameters.

As per the above, the control process involves very complex control factors.

Furthermore, when the transmitted light quantity is changed by moving the ND filter and varying the density of the ND filter, the diameter of the aperture is often small. Then a slight difference in the ND filter density results in a large difference in the transmitted light quantity.

Therefore, especially when the gradation ND filter whose density changes continuously at any position in accordance with the operation amount thereof is used to control the light quantity, it is very difficult to determine the relationship between the operation amount and the transmitted light quantity.

On the other hand, in the case of the step ND filter, it is sufficient to consider only the position at which the density changes. In other words, it is sufficient to consider only the ratio of the area of the lower density portion and the area of the higher density portion. Therefore, the control process is relatively easy, since it can be performed based on a concept similar to that in the case where a conventional uniform density ND filter is used.

However, in the case of the step ND filter, as light is considered as a wave, a difference in the optical thickness of ND film in the regions of the filter that the light passes causes a phase difference, which affects the image quality. Specifically, as disclosed in Japanese Patent Application Laid-Open No. 2004-253892 (see page 22 and FIG. 24), a transmission wave front phase difference affects the image quality.

This is because in the case of a kind of step ND filter in which the density is varied by changing the thickness of a ND film having the same constant refractive index, phases of light beams having passed through regions having different densities associated with different ND film thicknesses become different from each other to cause interference that weakens the light, thereby deteriorating the resolution. The deterioration of the image quality becomes maximum when the areas of the regions having different densities are equal to each other. If the difference in the ND film thickness between these regions or the transmission wave front phase difference is changed in that state, the MTF (modulation transfer function) value (representing axial optical characteristics) will change with a cycle $\lambda$.

The MTF value changes in the following manner. The MTF value decreases as the phase difference between the regions increases from zero, and the MTF value takes an extremal value at a phase difference of $2\lambda/4$ and starts to increase, then takes an extremal value at a phase difference of $4\lambda/4$ and starts to decrease again, then takes an extremal value at a phase difference of $6\lambda/4$ and starts to increase, and takes an extremal value again at a phase difference of $8\lambda/4$.

As compared to the gradation ND filter, the step ND filter suffers from deterioration in image quality caused by diffraction that occurs due to density discontinuity at the boundary between regions with different densities, especially in the case where the density difference is large.

As per the above, the step ND filter suffers from the problem of diffraction and transmission wave front phase difference, and the image quality is sometimes worse in cases where a step ND filter is used than in cases where a gradation ND filter is used.

However, control of an iris device is easier, and a control program can be developed in a shorter time in cases where a step ND filter is used than in cases where a gradation ND filter is used.

SUMMARY OF THE INVENTION

The present invention has been made in view of the above described problems, and has as an object to provide an ND filter with which an iris device can be controlled relatively easily as with step ND filters. And it is possible to reduce a deterioration of the optical performance.

An exemplary ND filter according to the present invention is provided with a first region having an ND film with a uniform density, a second region having an ND film with a uniform density different from the density of the first region, and a density transition region provided between the first region and the second region. The density transition region has an ND film whose density changes continuously from the density of the first region to the density of the second region.

Further features of the present invention will become apparent from the following description of exemplary embodiments (with reference to the attached drawings).

DETAILED DESCRIPTION OF THE INVENTION

An ND filter for regulating light quantity according to an embodiment will be described with reference to FIGS. 1A, 1B and 1C.

Figure 1A:
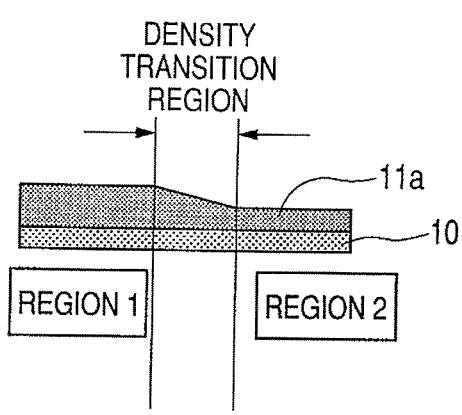
FIGS. 1A, 1B and 1C illustrate the structure of an ND filter according to the present embodiment.
Figure 1B:
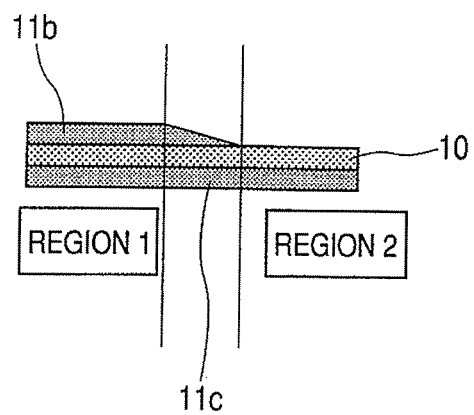
Figure 1C:
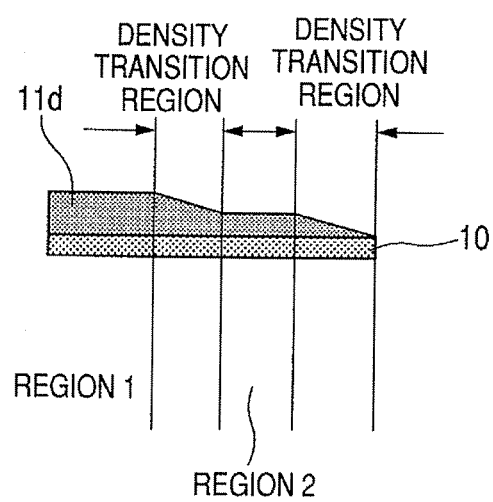

In FIGS. 1A to 1C, reference numeral 10 designates a transparent base member and reference numerals 11a to 11d respectively designate ND films each of which is a multi-layer film. The ND filter according to this embodiment has a density transition region having an ND film over which the density changes continuously provided between region 1 having a uniform density ND film and region 2 having a uniform density ND film with a density different from that of region 1. FIG. 1A illustrates a case in which the above described structure is realized by forming an ND film 11a only on one surface of the transparent base member 10. FIG. 1B illustrates a case in which the above described structure is realized by forming ND films 11b, 11c on both surfaces of the transparent base member 10. FIG. 1C illustrates a modification of the structure shown in FIG. 1A, in which a density transition region is provided between region 2 and a region having a transmittance of 100% (i.e. a region in which an ND film is not formed).

It should be noted that in FIGS. 1A to 1C, the thickness of the ND film and the base member are illustrated in an exaggerated manner.

In arranging the ND film having various densities, it is allowable to provide three or more uniform density regions. However, it is considered that the upper limit of the number of the uniform density regions is four or five in view of the stress in the base member and the ND films.

Because each region may be designed to have any desired density, in the structure according to the embodiment described in the following, region 1 has a density D of 1.0, and a film thickness of 500 nm and region 2 has a density D of 0.5 and a film thickness of 250 nm. Here, the density D is represented as $D=\log_{10}$(transmittance), namely, when the transmittance is 10%, D=1.0, and when the transmittance is 32%, D=0.5.

As per the above, in the case where density D of region 1 is set to 1.0 and the density of region 2 is set to 0.5, the transmission wave front phase difference between region 1 and region 2 is approximately $\lambda/2$.

This relationship in the densities is not desirable when it comes to the transmission wave front phase difference, but from the viewpoint of the density design, these density values have been adopted in conventional step ND filters and this relationship is demanded for practical step ND filters.

Lamination of the ND film is performed by forming uniform density film with a density D of 0.5 twice by vapor deposition. As described before, FIG. 1A illustrates a case in which two such uniform density ND films are formed one on top of the other, on one surface of the transparent resin base member 10. FIG. 1B illustrates a case in which a uniform density ND film is formed on one surface of the transparent base member 10 and another uniform density ND film is formed on the other surface of the transparent base member 10. FIG. 1C illustrates a structure that is most suitable in the case where the ND filter may be inserted halfway into an aperture. By continuously varying the density also at the cut end portion of region 2 as is the case with the structure illustrated in FIG. 1C, deterioration in image quality can be suppressed.

In the above described structure, if transition of density at the boundary of two different density regions is discontinuous, diffraction occurs due to a large density difference. In addition, depending on the ratio of the areas of the two regions, influence of the transmission wave front phase difference becomes large and causes deterioration in image quality (i.e. a lowering of the resolution).

A transmission wave front phase difference is generated depending on the relationship of the film thickness of the two regions even if the density is not particularly discontinuous at their boundary. In particular, deterioration in image quality becomes most pronounced when the proportions of the areas of the two density regions are respectively 50%.

In this embodiment, it is possible to reduce deterioration in image quality caused by the transmission wave front phase difference by providing, between the two density regions, a region having a certain width over which the density changes continuously. For example, if the proportions of the two uniform density regions are respectively 40%, a density transition region with a proportion of 20% is provided.

As described above, according to the ND filter of this embodiment, it is possible to reduce influence of diffraction even in the case where the density difference between the two uniform density regions is large. Furthermore, it is also possible to reduce deterioration in the resolution even in the case where the transmission wave front phase difference assumes a value that deteriorates resolution, that is, for example, when the transmission wave front phase difference is $2\lambda/4$ or $6\lambda/4$. In addition, by designing the density transition regions to have a width not exceeding a predetermined upper limit, it is possible to adopt a control system the same as or similar to the control system for iris devices using a conventional step ND filter, and therefore it is possible to reduce the effort of developing the control system.

This means that the control circuit for the iris device may be the same both in the case where a product equipped with a conventional step ND filter is to be developed and in the case where a product equipped with an ND filter according to the present invention is to be developed. Therefore, it is possible to save the effort of developing and manufacturing the control circuit.

Next, a method of manufacturing the above described ND filter having a density transition region will be described. In this embodiment, the ND filer is manufactured using a vacuum vapor deposition method.

Figure 2A:
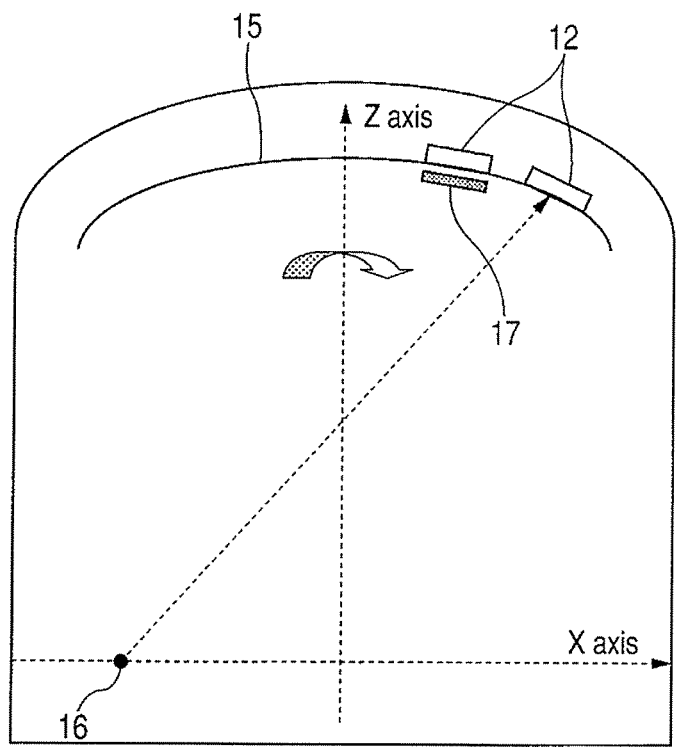
FIGS. 2A and 2B schematically illustrate the interior of a chamber of a vacuum vapor deposition apparatus.
Figure 2B:
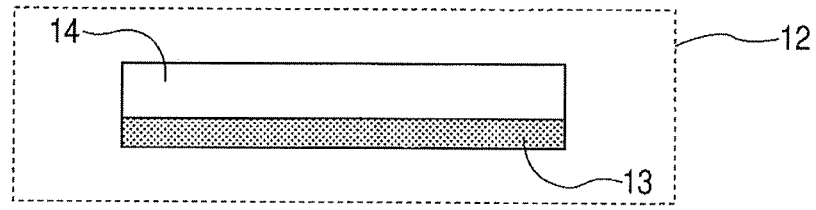

FIGS. 2A and 2B are schematic diagrams illustrating the interior of a chamber of a vacuum vapor deposition apparatus. In FIG. 2A, reference numeral 12 designates a substrate on which a film is to be formed, reference numeral 15 designates a vapor deposition umbrella, reference numeral 16 designates a vapor deposition source, and reference numeral 17 designate a mask. The substrate 12 in FIG. 2A includes a substrate jig 14 and a base member 13 (i.e. a transparent base member 10) set thereon, as specifically illustrated in FIG. 2B.

Figure 3:
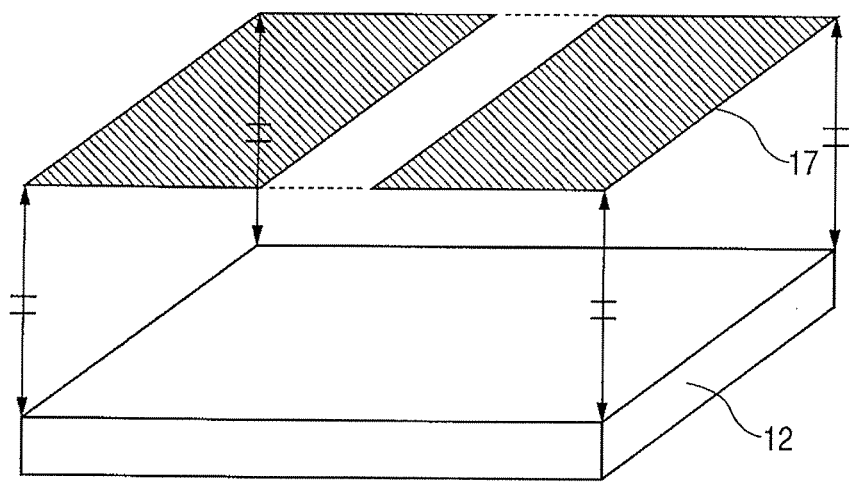
FIG. 3 illustrates arrangement of a substrate 12 and masks 17 in a process of producing a density transition region.

According to typical vacuum vapor deposition methods, the substrates 12 in the chamber are set on the vapor deposition umbrella 15 as shown in FIG. 2A, and film formation is performed while rotating the vapor deposition umbrella 15 together with the substrates 12. In this embodiment, a mask 17 shown in FIG. 3 is disposed parallel to each substrate 12 at a position apart from the substrate 12 by a desired distance on the vapor deposition source 16 side of the substrate 12. With this arrangement, deposition particles to be deposited can sometimes pass through the mask 17 and reach the substrate 12 and are sometimes blocked by the mask 17 and cannot reach the substrate 12, depending on the geometrical positional relationship among the vapor deposition source 16, the substrate 12 and the mask 17. Thus, a ND film thickness distribution in the density transition region in which the density changes continuously between two uniform density regions is obtained.

In the above arrangement, if the mask 17 is in close contact with the substrate 12 at the time of deposition, a sharp (or discontinuous) boundary is produced between the region on which a ND film is deposited and the region on which a ND film is not deposited. In contrast, the wider the distance between the mask 17 and the substrate 12 is, the more the boundary is blurred.

Figure 4:
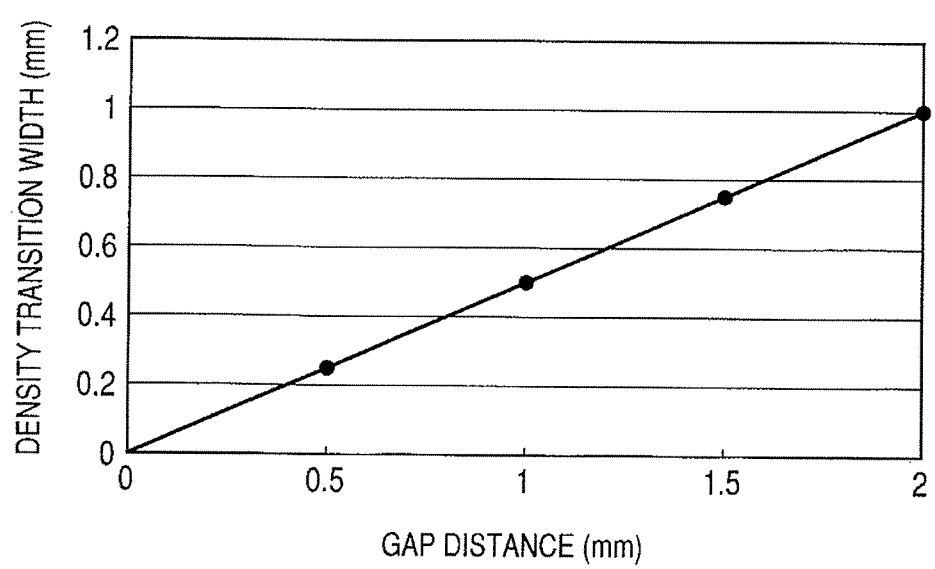
FIG. 4 is a graph showing the relationship between the density transition width and the GAPdistance.

FIG. 4 shows the relationship between the width of the density transition region (density transition width) and the spatial distance between the substrate 12 and the mask 17 (GAP distance). It will be seen from FIG. 4 that when the density is to be varied over a width of 0.1 mm to 0.3 mm as is the case with this embodiment, it is desirable to set the GAP distance within the range of 0.2 mm to 0.6 mm.

We produced, using the above described method, an ND filter having a density transition region in which the density changes continuously provided in the boundary portion between two density regions 1 and 2 each of which has a uniform density as shown in FIGS. 1A to 1C.

Although the forgoing description has been directed to a case in which a thin film is formed on a base member using a vacuum vapor deposition method, the ND filter according to the present invention may be produced not only by the vacuum vapor deposition but also by sputtering, ink jet printing and other methods. These methods of forming a film are commonly known, and descriptions thereof will be omitted.

In the following, various conditions in the process of producing the ND filter of this embodiment will be described.

Figure 5:
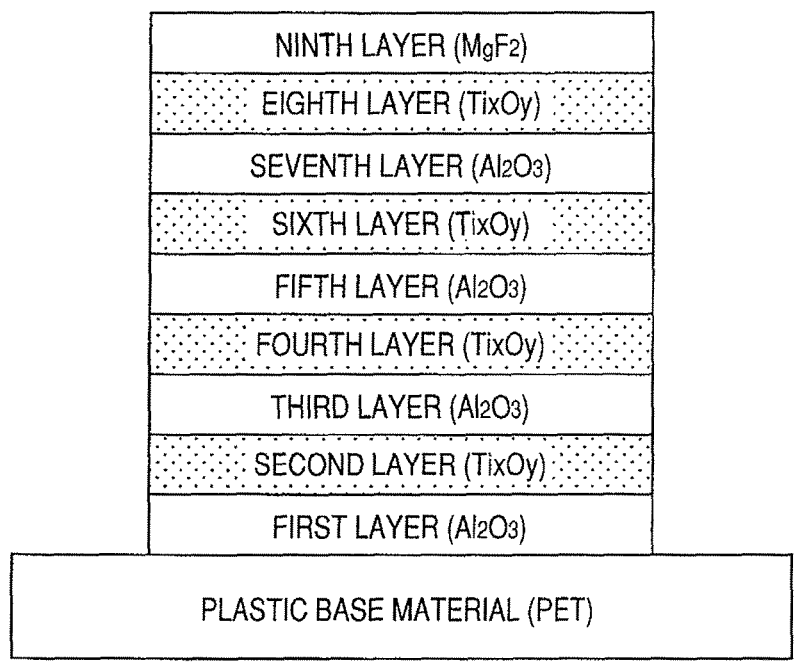
FIG. 5 is a cross sectional view showing a structure of an ND filter.

First, two masks like that shown in FIG. 3 are set on the vapor deposition source side of each substrate on which deposition is to be performed, and among the layers shown in FIG. 5, the first and all the subsequent layers except for the outermost layer were formed by vacuum vapor deposition. The base member 13 used was a PET base member having a thickness of 75 μm.

The vacuum vapor deposition method was adopted for the reason that with this method the film thickness can be controlled relatively easily, and ND filters produced by this method have an advantage of little diffraction in the visible wavelength range.

The material of the base member selected was PET, which has a high heat resistance (high glass transition point Tg), high transparency in the visible wavelength range and low water absorption coefficient. The base member may be made of a polycarbonate or a norbornene resin.

Next, the masks provided over each substrate were removed from the chamber, and the outermost layer was formed to satisfy the condition that the optical film thickness n×d (n: refractive index, d: mechanical film thickness) is equal to $\lambda/4$ ($\lambda$: 540 nm).

The material of the outermost layer was selected to have a refractive index n smaller than or equal to 1.5 in the visible wavelength range. Specifically, the material used was MgF2. In connection with the above, if all of the first to the outermost layers are formed with a varying film thickness using the masks shown in FIG. 3, the anti-reflection condition will not be satisfied. As a result, the reflectivity will be increased to invite phenomena deteriorating image quality such as "ghost" or "flare". In view of this, we formed the outermost layer after removing the masks to make the film thickness of the outermost layer uniform all over the substrate.

In the following, an iris device using the ND filter thus produced will be described.

The size of the light receiving element of an image taking apparatus equipped with the iris device was ½ inch, which is a typical size of solid-state image pickup elements for video cameras. The aperture diameter φ in the full open state was assumed to be 5 mm. An iris device that regulates the light quantity by varying the diameter of the aperture formed by a plurality of aperture blades is typically used in photographing optical systems of image taking apparatuses such as video cameras.

Figure 6:
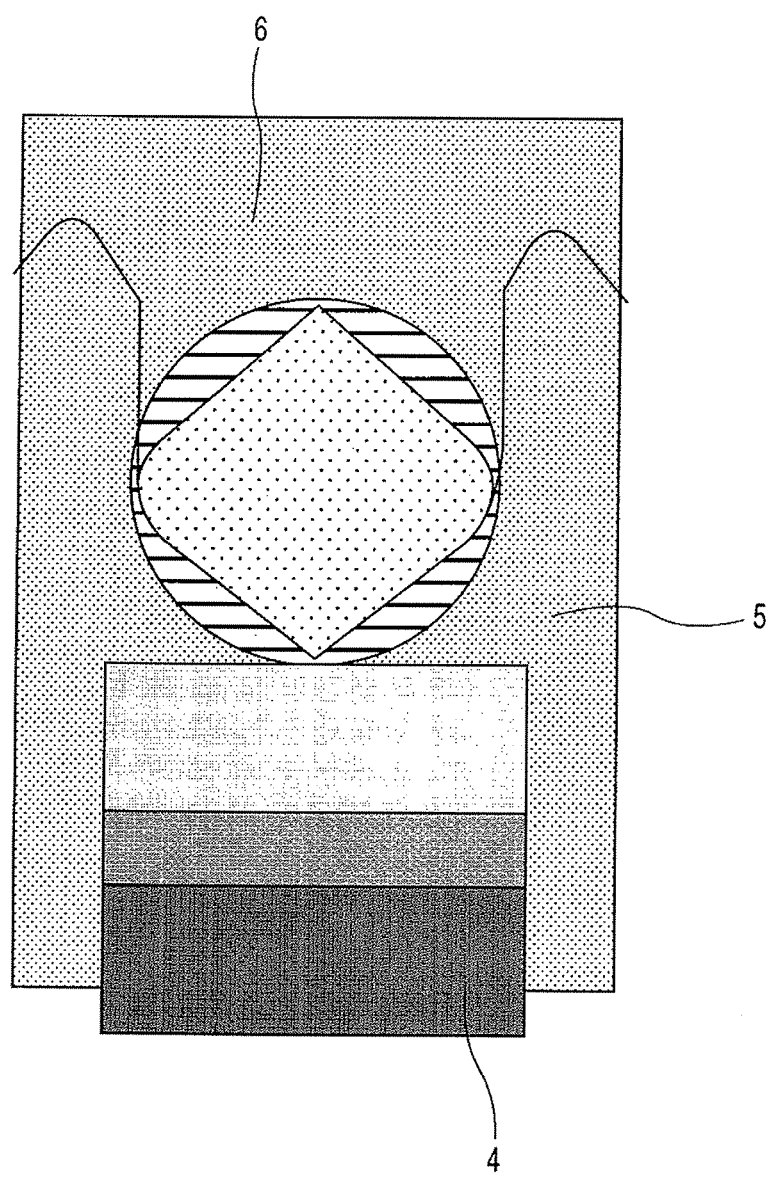
FIG. 6 illustrates the structure of a iris device.

In such a image taking apparatus, a light quantity regulation apparatus that uses aperture blades and an ND filter for reducing the quantity of light passing through the aperture in combination to prevent the aperture diameter from becoming excessively small as shown in FIG. 6 is used. In FIG. 6, reference numeral 4 designates the ND filter and reference numerals 5 and 6 designate the aperture blades.

In regulating the light quantity using the aperture blades 5, 6 and the ND filter 4 shown in FIG. 6, for example hall elements and detection circuits are provided in the vicinity of a motor (not shown) for driving the aperture blades and a motor (not shown) for driving the ND filter, to control driving of the motors. In doing so, the relationship of the output voltages of the hall elements corresponding to the rotation of the rotors in the respective motors and the position of the aperture blades or the ND filter is obtained in advance, and the motors are driven and controlled while monitoring the outputs voltage of the hall elements.

Comparison performed between the case where a step ND filter having a discontinuous density boundary is used and the case where a gradation filter is used shows that there were light quantity differences larger than 0.5 EV at positions at which the output voltages of the hall element are identical in both cases, at some ND filter positions. This is because, as described before in connection with problems of conventional arts, there is an inherent difference between changes in the transmitted light quantity caused by continuous density variations of gradation ND filter and those caused by the step ND filter.

On the other hand, comparison performed between the case where a step ND filter having a discontinuous density variation at density boundary is used and the case where an ND filter according to this embodiment having a density transition region with a width within the range of 0.2 mm to 0.3 mm is used shows that the light quantity difference was approximately 0.09 EV at a maximum, which does not matter significantly. This is because even if a difference in the transmitted light quantity is generated due to variations in the position of the density transition region or other factors, the difference will be insignificantly small, since the area thereof is small as compared to the area of the aperture.

Figure 7A:
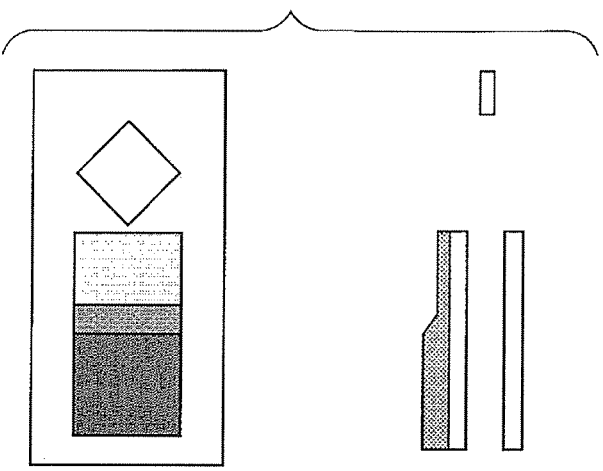
FIGS. 7A, 7B and 7C illustrate operations of the ND filter in the iris device.
Figure 7B:
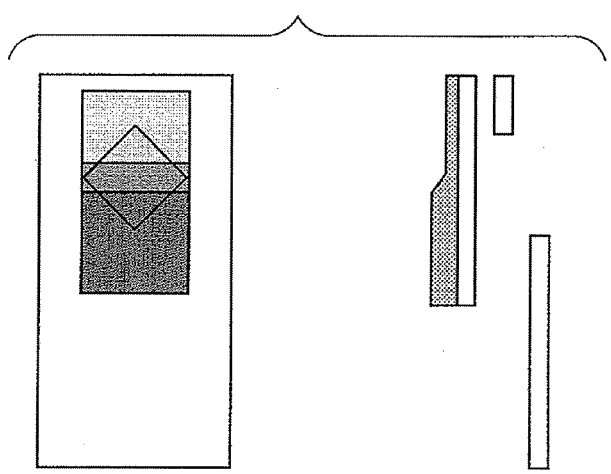
Figure 7C:
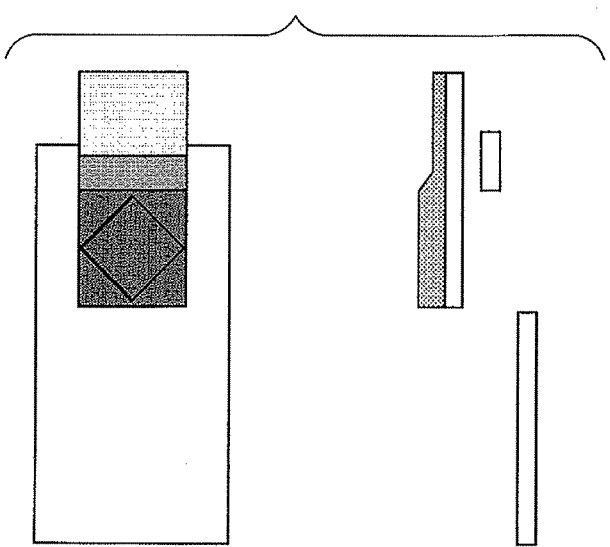

In the control system used in the above experiments, when the F number was changed from full aperture (F/2.0) to F/3.0, the aperture diameter was decreased by the aperture blades (FIG. 7A). When the F number was changed from F/3.0 to F/10 (represented by equivalent F numbers corresponding to light quantity reduction amounts), the aperture blades were kept at a fixed position (namely, the aperture blades are at the position attaining F/3.0), and the light quantity was reduced by inserting the ND filter having two density regions into the aperture (FIG. 7B). At approximately F/10, the density transition region got out of the aperture area and the higher density region covered the entire aperture area (FIG. 7C). Thereafter, the ND filter was kept stationary, and only the aperture blades were driven (such a driving system is disclosed for example in Japanese Patent Application Laid-Open No. 2000-106649).

At approximately F/3.0 at which an experiment on the relationship between the operation of the ND filter and the light quantity was performed, the area of the aperture formed by the aperture blades was 7.1 mm² and the diagonal length of the square aperture was 3.77 mm.

In that state, the direction of movement of the ND filter was substantially parallel to the diagonal. The density boundary portion (or the density transition region) had a density gradient along the direction of movement of the ND filter, and had no density variation along the direction perpendicular to the direction of movement.

The proportion of the area of the density transition region to the area of the aperture is 5.26% if the region has a width of 0.1 mm, 10.4% if the region has a width of 0.2 mm, and 15.5% if the region has a width of 0.3 mm.

As the density transition region moves relative to the aperture, the area of the portion of the density transition region that overlaps the aperture and the proportion of that area relative to the area of the aperture change. The proportions of the area of the density transition region relative to the area of the aperture indicated above are values measured when the density transition region is at substantially the center at which influence of the transmission wave front phase difference is most prominent.

When the width of the density transition region over which the density changes continuously is smaller than 0.1 mm, and the density transition region is positioned near a corner of the square aperture, one aperture blade and the high density uniform density region form a shape similar to the aperture in the small aperture state likewise they form a shape similar to the aperture in the case when density variation at the density boundary is discontinuous. Accordingly, influenced by diffraction and the transmission wave front phase difference, deterioration in image quality become significant. To avoid the influences, a density transition region having a width at least 0.1 mm was necessary.

Relating to upper limit, a density transition region having a width of 0.4 mm reduce the influences of the transmission wave front phase difference and diffraction. However, it suffered from significant exposure errors under the same experimental condition described above, since its structure was similar to a gradation ND filter.

Here, the difference in the quantity of transmitted light (i.e. exposure amount error EV) of the light quantity regulation apparatus caused by the difference between the adequate aperture area and the actual aperture area under the same control condition is represented by the following formula.

$$\mathrm{Log}(S2/S1)/\mathrm{Log}2 = \text{exposure amount error EV}$$

$S2$: actual aperture area
$S1$: adequate (or target) aperture area

This formula expresses the fact that the quantity of transmitted light (exposure amount) changes by 1 EV as the aperture area is doubled or halved.

It is generally said that allowable errors (deviations) from the adequate aperture area in video cameras, digital still cameras and the like that uses a solid-state image pickup element such as a CCD are ±0.15 EV at maximum, and it is preferred that errors be ±0.1 EV or less.

By substituting ±0.15 EV for the right-hand side of the above formula as below:

$$\mathrm{Log}(S2/S1)/\mathrm{Log}2 = \pm 0.15\ \mathrm{EV},$$

we find the following values of $S2/S1$:

$$S2/S1 = 1.11, 0.90.$$

This means that the actual aperture area is allowed to deviate from the correct aperture position up to 11% on the larger aperture diameter side and 10% on the smaller aperture diameter side.

These allowable exposure amount error values are applicable to the case where the iris is constructed only by a part having a transmittance of 0% and a part having a transmittance of 100%, like in the case where the iris is constituted by normal aperture blades. If a region over which the density continuously changes is provided at the boundary of those parts, considering allowable 11% increase of exposure amount, the allowable maximum area of that region is 22%. However considering allowable 10% decrease of exposure amount, the allowable maximum area of that region is 20%.

In practice, the iris is constituted with an ND filter, which does not block light completely. Hoever the transmittance of high density ND filters used in normal light quantity regulation apparatuses and suffering from the aforementioned problem falls within the range of about 10% to 30%, as described beforeand the result derived from the above formula approximately applies to them. On the other hand, since relatively low density ND filters are unlikely to cause problems such as diffraction, this invention is not necessary.

Furthermore, theoretically, the exposure error can be reduced to zero by arranging the region in which the density changes continuously in such a way that the center of that region comes to the center of aperture. However, this is technically difficult in view of the method of producing the region in which the density changes continuously, and to prevent exposure control method becoming difficult, it is preferred that the width of the region in which the density changes continuously be limited within the aforementioned range, preparing for the worst.

Influence of the presence of the density transition region on the exposure amount becomes maximum when the areas of the adjacent uniform density regions are substantially equal to each other within the aperture. Therefore thearea of the region in which the density changes continuously (density transition region) should be kept smaller than 20% of the area of the aperture at that time. In other words, if the width of the density transition region is designed in such a way that the area of the density transition region existing within the aperture is smaller than 20% of the area of the aperture, errors in the exposure amount can be kept within ±0.15 EV. Therefore, the iris device containing a filter having such a density transition region can be controlled satisfactorily by a same control circuit which controls the iris device containing conventional step ND filters.

In connection with the iris device containing a filter having such a density transition region mentioned above, when the allowable exposure amount error in this embodiment is 0.09 EV, the allowable error in the area without ND filter obtained by calculation is 6.44%, namely, in this embodiment of ND filter the allowable maximum area of the region in which the density changes continuously is 12.9% of the area of the aperture, and its allowable maximum width is approximately 0.25 mm. This substantially coincides with the result of the above calculation. Therefore when the allowable exposure amount error in this embodiment is 0.15 EV, allowable maximum area of the region in which the density changes continuously is 20% of the area of the aperture, and its allowable maximum width is approximately 0.4 mm.

As per the above, the allowable width of the region in which the density is changed continuously at the density boundary is 0.1 mm or more, and the allowable maximum area of the density transition region is 20% of the area of the aperture at the time when the areas of the adjacent uniform density regions within the aperture are substantially equal to each other. It is more preferred that the area of the density transition region be within 15% of the area of the aperture.

Although the above description of the embodiment has been directed to an ND filter having two densities, the above description also applies to ND filters having three or more densities.

Next, another embodiment in which a iris device having an ND filter according to the present invention is applied to an optical apparatus (video camera) will be described with reference to FIG. 8.

Figure 8:
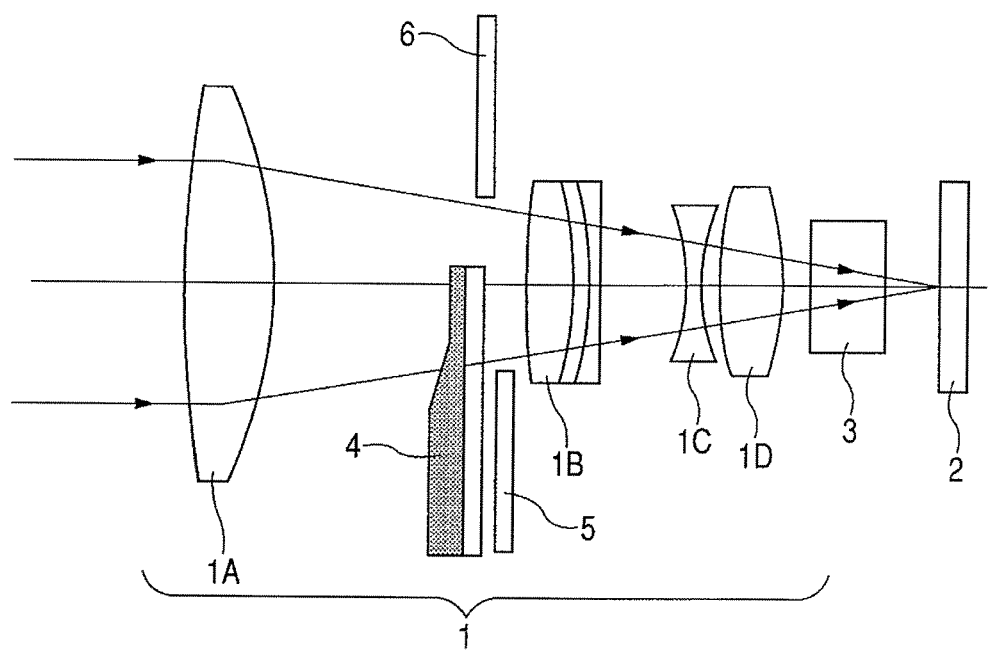
FIG. 8 schematically illustrates the relevant portion of an optical apparatus according to an embodiment.

In FIG. 8, what is designated by reference numeral 1 is a photographing optical system including lens units 1A to 1D. Reference numeral 2 designates a solid-state image pickup element such as CCD, which receives an optical image formed by the photographing optical system 1 and converts it into an electric signal. Reference numeral 3 designates an optical low-pass filter. The photographing optical system 1 has the iris device including the ND filter 4 and the aperture blades 5, 6 shown in FIG. 6.

According to the embodiment having the above described structure, it is possible to provide an ND filter with which improvement in resolution can be expected. In addition, when an iris device using the same is applied in an optical apparatus having a solid-state image pickup element and a photographing optical system, it is possible to save the effort of development and production of its control circuit.

More specifically, in developing a series of products including a product equipped with a conventional step ND filter and a product equipped with an ND filter according to the present invention, a common control circuit for the iris device may be used in both types of products. This facilitates development and production of the control circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ND filter comprising:
a transparent base member, the transparent base member defining a first surface and a second surface;
a first region having an ND film with a uniform density;
a second region having an ND film with a uniform density different from the density of the first region;
a density transition region provided between the first region and the second region, the density transition region having an ND film whose density changes continuously from the density of the first region to the density of the second region,
wherein said density transition region ranges from 0.1 mm to 0.4 mm in width.

2. The ND filter according to claim 1, wherein both of said first region and said second region are formed on one of the first and second surfaces of the base member.

3. The ND filter according to claim 1, wherein at least one of said first region and said second region is formed on both surfaces of the base member.

4. An iris device comprising:
an aperture blade that defines an aperture; and
an ND filter configured to reduce the quantity of light passing through the aperture,
the ND filter including:
a first region having an ND film with a uniform density;
a second region having an ND film with a uniform density different from the density of the first region; and
a density transition region provided between the first region and said second region, the density transition region having an ND film whose density changes continuously from the density of the first region to the density of said second region,
wherein said density transition region has a predetermined width such that when the ND filter is within said aperture, said first region and said second region each occupy an area equal to each other, and said density transition region within said aperture occupies an area equal to or smaller than 20% of an area defined by said aperture.

5. The iris device according to claim 4, wherein the width of said density transition region ranges from 0.1 mm to 0.4 mm.

6. An optical apparatus comprising:
an optical system including an iris device according to claim 4; and
a solid-state image pickup element configured to receive an image formed by said optical system.

7. An iris device comprising:
an aperture blade that defines an aperture; and
an ND filter configured to reduce the quantity of light passing through the aperture,
the ND filter including:
a first region having an ND film with a uniform density;
a second region having an ND film with a uniform density different from the density of the first region; and
a density transition region provided between the first region and said second region, the density transition region having an ND film whose density changes continuously from the density of the first region to the density of said second region,
wherein said density transition region ranges from 0.1 mm to 0.4 mm in width.

* * * * *